(No Model.)
R. NEWTON.
TEMPERATURE CONTROLLER.
No. 374,847. Patented Dec. 13, 1887.
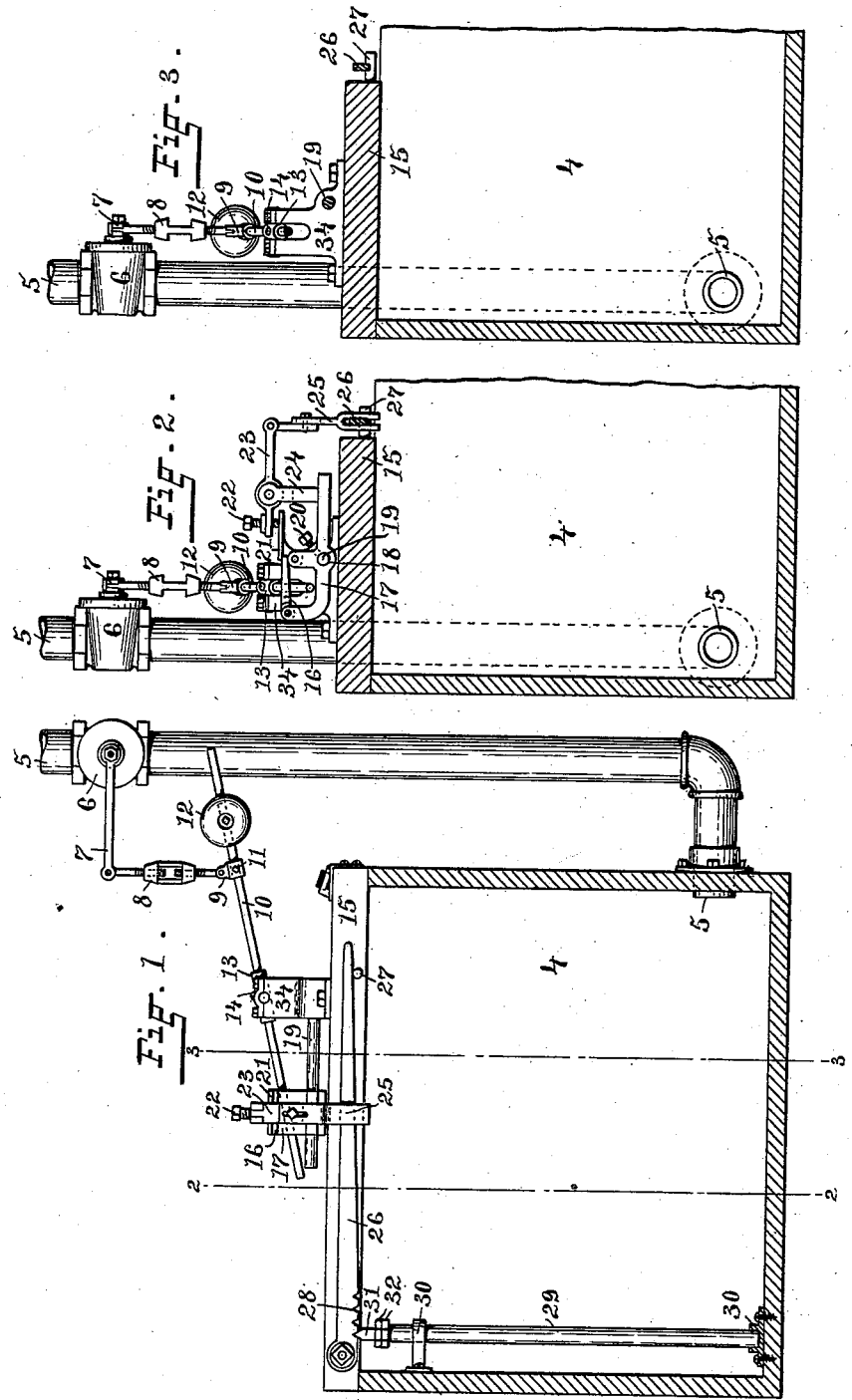
WITNESSES:
Chas. H. Luther Jr.
Willis Fowler.
INVENTOR:
Robert Newton
by Joseph A. Miller & Co
Attys

UNITED STATES PATENT OFFICE.

ROBERT NEWTON, OF PROVIDENCE, RHODE ISLAND.

TEMPERATURE-CONTROLLER.

SPECIFICATION forming part of Letters Patent No. 374,847, dated December 13, 1887.

Application filed July 29, 1887. Serial No. 245,598. (No model.)

*To all whom it may concern:*

Be it known that I, ROBERT NEWTON, of Providence, in the county of Providence and State of Rhode Island, have invented certain new and useful Improvements in Heat-Regulators for Vats or Tubs, of which the following is a full, clear, and exact description, reference being had to the accompanying drawings, forming part of this specification.

This invention relates to mechanism for regulating the heating of the contents of washing, dyeing, or other vats, tubs, keirs, or the like, and has especial reference to the steam-heated vats.

The object of the invention is to provide efficient mechanism whereby when the liquid in the vat has reached a predetermined degree of temperature the mechanism will automatically prevent the temperature from rising above such predetermined degree.

To the aforesaid purpose the invention, briefly stated, consists in placing within the liquid in the vat an expansible member, which may be expanded by the action of the heat of such liquid, and placing the controlling-valve of the steam-supply pipe of the vat under the control of the said expansible member through means of the novel connections therebetween, so that when the steam has heated the liquid in the vat to a predetermined degree the expansion of the said member will serve to operate the valve and close the same and cut off the steam-supply, and thus prevent the liquid from reaching a higher degree of temperature.

The invention further consists in the novel and peculiar constructions and arrangements of the several parts of the apparatus, all as hereinafter fully described and claimed.

In the accompanying drawings, illustrating my invention, Figure 1 is a vertical sectional view of a steam-heated vat provided with my improved heat-regulating mechanism; and Figs. 2 and 3 are partial sectional views of the apparatus shown in Fig. 1, the sections being taken on the lines 2 2 and 3 3, respectively.

In the said drawings like numbers of reference designate corresponding parts throughout.

Referring to the drawings, the number 4 designates an ordinary vat or tub, which is provided with the steam-supply pipe 5, opening near the bottom thereof, by means of which the liquid contents of the vat are heated in a manner well known. This steam-supply pipe 5 is provided with a controlling-valve, 6, for controlling the supply of the steam to the vat, and the valve is opened and closed by the attached crank 7, to the free end of which is pivoted the extensible link 8, which consists in the two screw-threaded parts which work in the open sleeve, the upper piece being secured to the valve-crank and the lower piece being pivoted to the slide 9, which is mounted on the tilting lever 10 and is provided with a set-screw, 11, for holding it at any adjustment on the said lever. The tilting lever 10 is provided at one end with the shiftable counter-weight 12 and is surrounded with the sleeve 13, which is provided with the binding-screw 14 and is pivoted to swing in the stand 34, mounted upon the shelf 15, placed across the top of the vat. By means of the sleeve and its binding-screw the tilting lever may have its fulcrum-point shifted, as desired, along its length in an obvious manner.

The end of the tilting lever 10 remote from where the counter-weight is located is engaged by the locking-arm 16, which is pivoted to the bracket 17, which is formed with the transverse opening 18, through which the journal-bar 19 is passed. The bracket 17 is adjustable on the journal-bar 19, and may be held immovably thereon by the set-screw 20. To the bracket 17 is also pivoted the latch 21, which, when in horizontal position, will engage and hold the locking-arm 16 in horizontal position, and so hold depressed the adjacent end of the tilting lever 10 against the force exerted by the counter-weight; and in this manner the valve is maintained open. The free end of the latch 21 is borne upon by the adjusting-screw 22, which is mounted at one end of the tilting arm 23, pivoted on an upright extension, 24, of the bracket 17, and is provided at one end with the adjustable extension 25, which is engaged at the lower forked end by the pivoted lever 26. This lever 26 is pivoted to the shelf 15 and rests upon the stud 27, and is formed with the notches 28 upon its under side.

The expansible member consists in the bar 29, which is loosely supported in a vertical position by the brackets 30, and in the upper end of the bar is screwed the screw-stem 31, which is provided with the adjusting-nuts 32, so that the screw-stem may be screwed up or down, and the entire length of the member and stem together may be increased or decreased accordingly.

The expansible bar may be made of any suitable metal or material, and it will be readily understood that the action of the heat of the heated contents of the vat will cause the bar to expand lengthwise, thereby raising the pivoted lever resting thereon and moving the tilting arm, which will depress the latch and thereby release the locking-arm, whereupon the counter-weight will tilt the lever and cause the valve to be closed, thereby cutting off the steam-supply.

By virtue of having the several parts of the mechanism intermediate and the expansible member and the controlling-valve adjustable, I can regulate with great accuracy the time when the valve is to be closed.

The automatic operation of my improved mechanism will prevent the possibility of overheating the contents of the vat—an accident of frequent occurrence through the carelessness of the operatives.

The mechanism may be applied to all kinds of work wherein liquids are heated in vats, either by the direct application of the steam, as I have shown it, or by the use of coiled steam-pipes.

Having thus described my invention, I claim as new and desire to secure by Letters Patent—

1. The combination, as hereinbefore set forth, with the steam-heated vat and the steam-supply therefor provided with a controlling-valve, of an expansible bar loosely supported within the vat and capable of being expanded by the action of the heat of the contents of the vat, a pivoted lever engaged and operated by said bar, a pivoted tilting lever having one end connected with the controlling-valve, and provided at said end with a counter-weight, and an adjustable latching device for latching the other end of the tilting lever when the valve is open and against the action of the weight, said latching device engaged and operated by the said pivoted lever upon the expansion of the said bar, substantially as and for the purpose herein described.

2. The combination, as hereinbefore set forth, with the steam-heated vat and the steam-supply pipe therefor provided with a controlling-valve, of an expansible bar supported within the vat and capable of being expanded by the heat of the contents of the vat and a pivoted lever engaged and operated by the said bar, a pivoted tilting arm provided with an adjusting-screw and having an arm adjustably mounted thereon and engaged by the said pivoted lever, a pivoted latch engaging the end of the adjusting-screw and a locking-arm engaged by the latch, a tilting lever having adjustable pivotal means and one end of the tilting lever engaging the locking-arm, the other end of the tilting lever provided with an adjustable counter-weight, the controlling-valve provided with a crank for operating the valve, and an adjustable link-connection intermediate the said crank and the weighted end of the tilting lever, substantially as and for the purpose herein described.

3. The combination, as hereinbefore set forth, with the vat 4, provided with the steam-supply pipe 5, having the controlling-valve 6, provided with the crank 7, of the tilting lever 10, adjustably mounted on the stand 34 and provided with the counter-weight 12 and the adjustable connection or link 8 between the lever 10 and the crank 7, the pivoted latch 16 and the tilting arm 23, provided with the adjusting-screw 22, engaged by the said latch 16, the pivoted lever 26 and the extensible arm 25, pivoted to the tilting arm 23 and engaging the pivoted lever 26, and the expansible bar 29, mounted vertically in said vat and provided with the screw-stem 31, engaging the pivoted lever 26, substantially as and for the purpose herein described.

ROBERT NEWTON.

Witnesses:
M. F. BLIGH,
J. A. MILLER, Jr.